Aug. 8, 1967 A. R. CAIRONE ET AL 3,335,213
LIGHTNING ARRESTER BRACKET AND ASSEMBLY
Filed Feb. 18, 1966
3 Sheets-Sheet 1
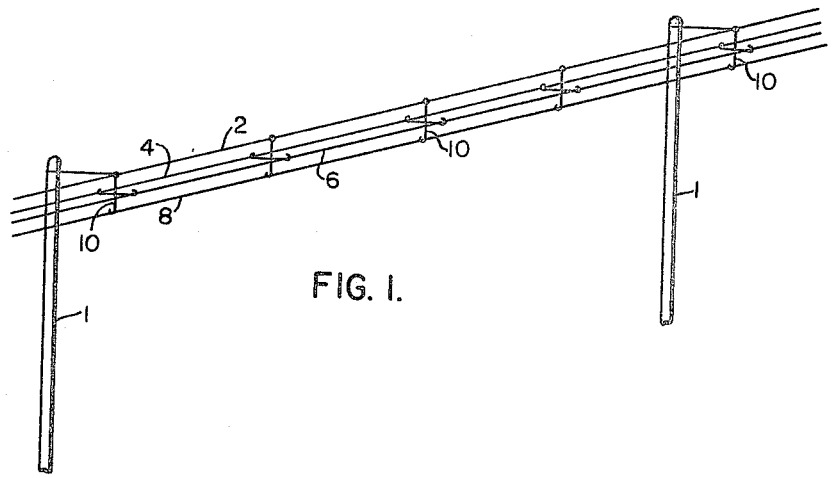
FIG. 1.
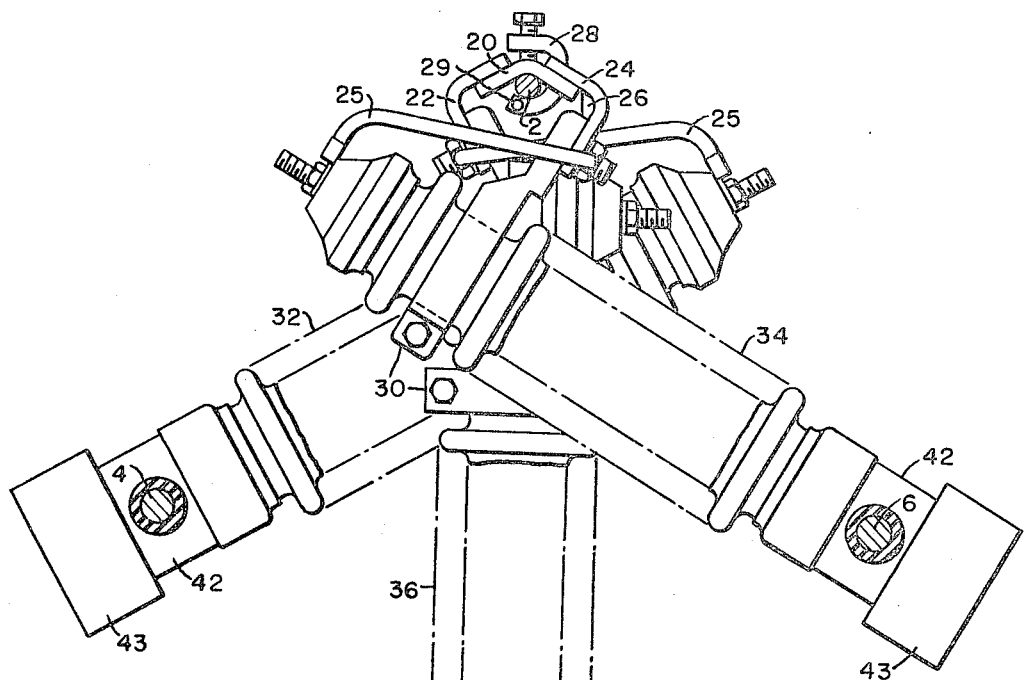
FIG. 2.
WITNESSES:
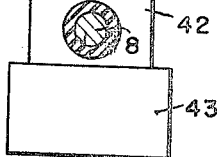
INVENTORS
Anthony R. Cairone and
Robert D. Milos, Jr.
BY
ATTORNEY United States Patent Office 3,335,213
Patented Aug. 8, 1967

3,335,213
LIGHTNING ARRESTER BRACKET AND ASSEMBLY
Anthony R. Cairone, Rumson, and Robert D. Milos, Jr., Edison Township, Metuchen, N.J., assignors to Westinghouse Electric Corporation, Pittsburgh, Pa., a corporation of Pennsylvania
Filed Feb. 18, 1966, Ser. No. 528,638
7 Claims. (Cl. 174—2)

The present invention relates to a means for supporting a plurality of lightning arresters in modern aerial spacer cable arrangements, and especially in three-phase spacer cable distribution systems.

In an effort to make overhead power distribution systems more neat in appearance, utility companies are seeking ways and means to eliminate the horizontal wooden cross arms mounted near the top of utility poles. The cross arms are usually six to ten feet long and, when supporting a plurality of brackets, insulators and lightning arresters, have a cluttered unsightly appearance. Spacer cable arrangements, in which the present invention has particular utility, go a long way in alleviating the problem briefly outlined above.

Spacer cable systems generally employ a steel wire messenger to support power phase lines between poles. An insulating spacer means in the form of a relatively small cross is supported by the messenger wire in a substantially free floating manner, the upper arm of the cross being attached to the messenger by an eye bolt or other suitable means. The remaining three arms (in a three-phase system) support three-phase lines below the messenger in close proximity to each other and to the messenger with enough distance between each of the phase lines and the messenger to insure adequate insulation. The spacer cable arrangement thus forms a compact means for conducting electrical power with the three-phase wires disposed at the corners of a triangular configuration and the messenger wire located at the apex of a diamond-shaped configuration.

As suggested above, the size of the spacer must provide adequate insulation between the phase conductors: e.g., on systems handling 13 kv. distribution voltages, the horizontal arms of the spacer are constructed to allow a distance of about fifteen inches to exist between the two-phase wires immediately below the messenger. The third (bottom) phase wire is separated from the two horizontal conductors by a distance somewhat less than fifteen inches. The distances will vary as dictated by various system voltages.

Aerial spacer cable systems have the obvious advantage of very small space requirements. However, the insulation level is lower and utility companies have experienced a high cable failure rate due to lightning flashovers. Because of the cable configuration, the system is not as readily adapted to the application of lightning arresters except at transformer locations. One of the primary purposes of the present disclosure is to overcome this disadvantage by providing a lightning arrester arrangement that facilities placing of arresters at any location along spacer cable lines without depending on transformers and other support means. In providing such systems with current surge and lightning protection, lightning arrester arrangements should further preserve the integrity of the spacer cable configuration.

Accordingly, the present disclosure describes a unique bracket arrangement for supporting a plurality of lightning arresters on a messenger wire at substantially any location therealong and in such a configuration that the power terminal of each arrester is readily available for electrical connection to the power phase lines with little or no displacement of the lines.

Broadly, the bracket comprises an all metal structure having an elongated axially angular piece of metal designed to rest on the messenger wire. The sides of the elongated metal piece (that form the angle) rest on and straddle the messenger wire, and can be further secured thereto by captive J bolts or the like. Affixed to the angle piece are arresters securing brackets so formed and positioned to allow the arrester for each power phase line to extend in the substantially precise direction thereof for ready connection thereto. Each bracket clamps each arrester near the ground or dropout end and holds it in proximity to the messenger wire which can be grounded at each wooden support pole. The ground lead of the arrester can be connected to the bracket for automatic grounding when the bracket is placed on the messenger. No metal (of the arrester bracket) extends down and between the power phase conductors. Only the arrester body structures extend between the messenger and phase conductors at acute angles to each other and at substantially perpendicular angles to the power lines. With such a bracket or hanger, flexible, multiphase arrester protection can be had anywhere along a spacer cable system. The present unique arrester arrangement further acts as a cable spacer thus eliminating the need for insulating spacers where the arrester assemblies are employed.

The novel arrangement briefly described above has the further advantage of being simple and easy to mount. One lineman can quickly secure the bracket to the messenger wire by simply placing the elongated angular portion across the messenger at approximately a 90 degree angle and then turning it to line up with the messenger. The bracket slips into position as the messenger wire slips into the positioning groove provided by the apex of the angle extending the length of the elongated piece of metal. Thus, the entire length of bracket supports the arrester assembly and insures excellent grounding contact with the messenger. Standard clamps and hardware are used with the present novel arrangement so that regular lineman tools can be employed to secure the arrangement.

It is therefore the general and primary object of the present invention to provide lightning arrester arrangements for spacer cable systems that will effectively preserve the cable configuration while simultaneously insuring quick and easy arrester installation, repair and replacement.

Another object of the invention is to provide a unique lightning arrester support bracket for multiphase spacer cable systems that further insures proper grounding of the arrester.

Yet another object of the invention is to provide a unitary lightning arrester arrangement that will function additionally as an insulating spacer in spacer cable systems having a plurality of phase conductors.

A further object of the invention is to provide a simple and inexpensive lightning arrester support bracket that maintains spacer cable configuration and stability under adverse conditions such as high velocity winds.

These and other objects of the invention will become apparent upon consideration of the following detailed description along with the accompanying drawings in which:

FIGURE 1 shows a typical three-phase spacer cable arrangement;

FIG. 2 is an end elevation view of the unique arrester combination and bracket structure constructed in accordance with the principles of the present invention;

Figure 3:
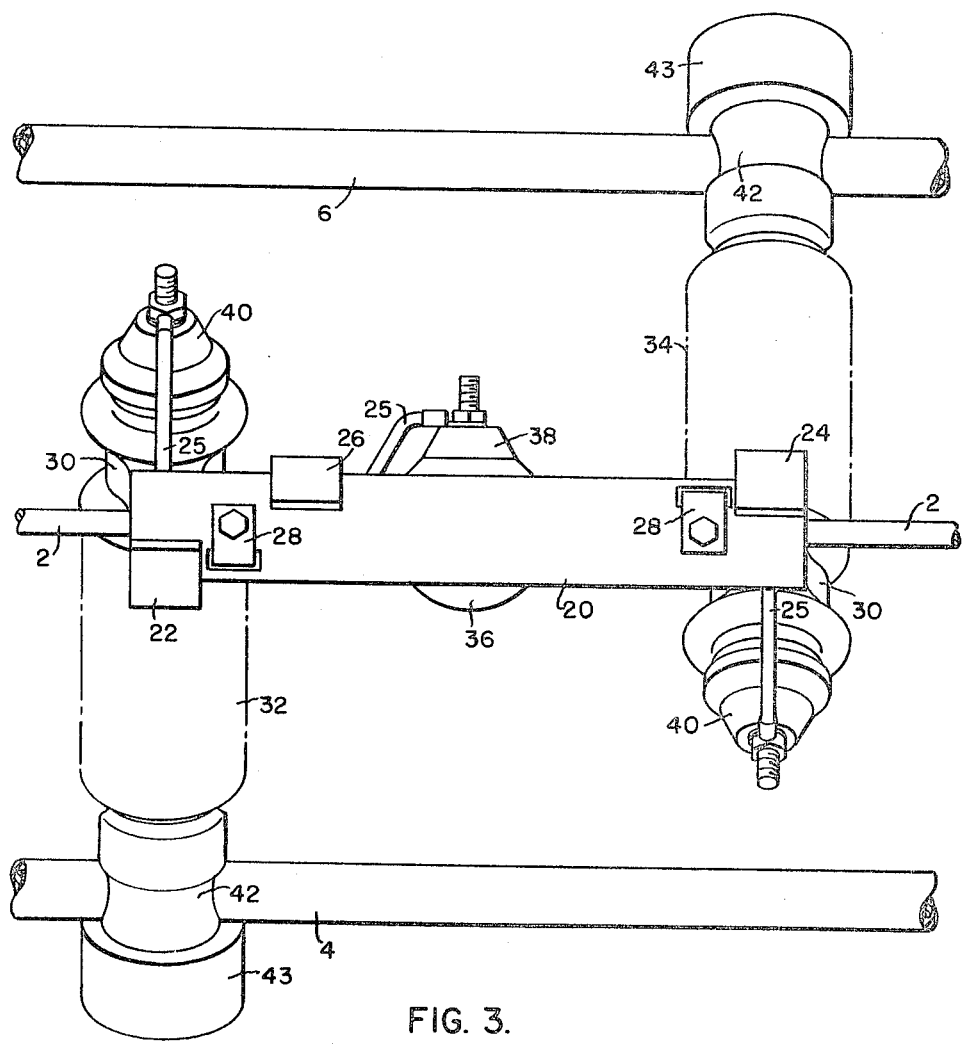
FIG. 3 is a top plan view of the structure shown in FIG. 2.

In FIG. 1 is shown a section of a three-phase spacer cable arrangement briefly described above. On poles 1 is supported a steel messenger wire 2 which can be grounded at each pole. Beneath the messenger are supported three-phase conductors 4, 6 and 8 handling distribution energy of say 4 or 13 kv. though the present invention is not limited thereto. As previously explained, the spacer cable configuration is maintained by the use of insulating spacers and, in FIG. 1, these spacers are designated by numeral 10. Spacers 10 are supported from the strong steel messenger 2 by suitable means associated with the appropriate arm of each spacer while the remaining three arms hold and secure phase conductors 4, 6 and 8 as shown. As can be readily seen, the phase conductors are relatively close together and, as such, produce decided advantages regarding space requirements, aesthetic considerations and the like. However, insofar as lightning protection is concerned, wooden cross arms or other types of arrester support means are purposely eliminated in such systems. In light of these developments, the present disclosure describes a lightning arrester combination and support arrangement that meets and maintains the requirements and purposes of spacer cable designs while simultaneously providing lightning and surge current protection in a flexible and efficient manner.

Figure 4:
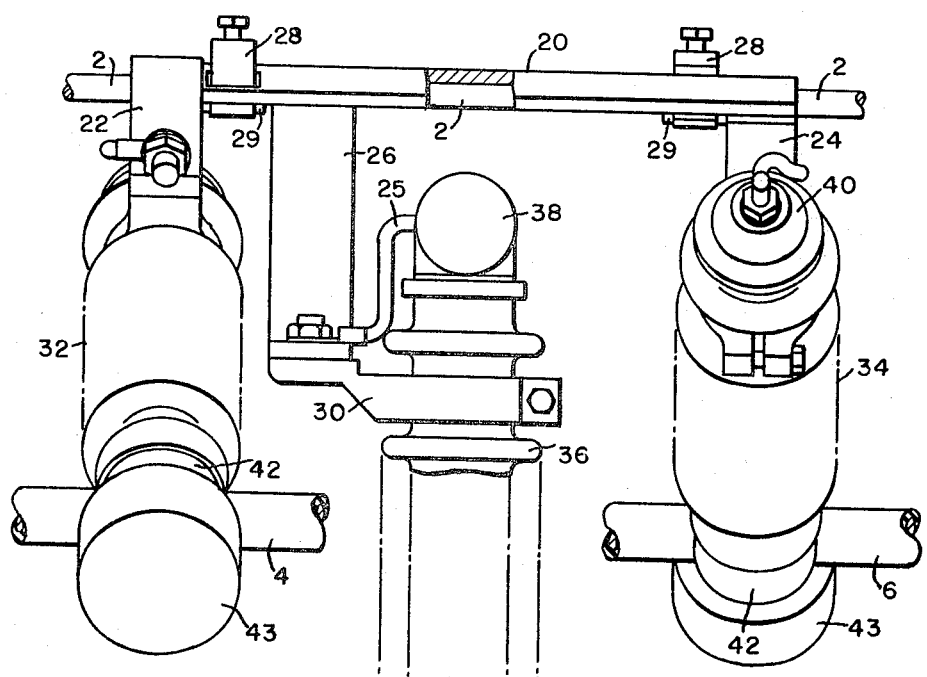
FIG. 4 is a partial side elevational view of the structure shown in FIG. 2.
Figure 4:
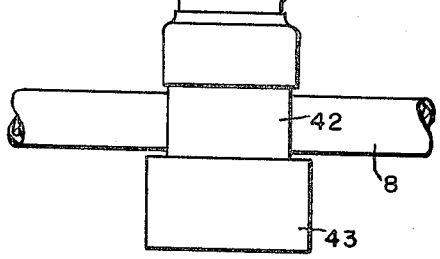

In FIGS. 2 through 4 are shown varying views of the arrester combination and support arrangement constructed in accordance with the principles of the present invention. In looking down on the structure, as shown in FIG. 3, elongated angle member 20 is shown in top plan elevation with lightning arresters 32, 34 and 36 attached thereto in a manner to be more fully explained hereinafter. Messenger wire 2 (see cut in member 20) rests in the angle formed in member 20 as best seen in FIG. 2, and can be further secured therein by the tightening of J bolts or clamps 28 (as shown) to lessen the possibility of the assembly from rocking or sliding in high winds and to assure a positive ground connection. Clamp 28 can comprise a substantially J-shaped member (best seen in FIG. 2) extending through an opening provided in member 20 with a lower curved portion extending under messenger wire 2. The upper (flat) portion of the clamp 28 extends over and above member 20 and has secured therein a threaded bolt. By virtue of the lower curved portion of the clamp engaging the messenger, member 20 can be tightened against the messenger with the turning of the threaded bolt into the clamp towards the messenger. Clamps 28 are held captive in member 20 so that they are readily available to the lineman for instant tightening. The captivity of clamp 28 is made possible by the threaded bolt in the upper portion thereof and an appropriate means 29 in the lower portion of the clamp which may take the form of a spring loaded pin or the like. The bracket, with the arresters secured thereto, can be installed by one man by simply placing member 20 on the top side of the messenger wire and swinging the assembly into place. It is not necessary for one man to hold the assembly while the other attaches a clamp, bracket or other securing means to messenger 2.

At each end of member 20 (FIGS. 3 and 4) metal piece extensions or tabs 22 and 24 are suitably affixed thereto for the purpose of securing arrester clamps 30 to member 20. Metal extensions 22 and 24 have two sections formed at substantially right angles to each other as best seen in FIG. 2 with one section attached to the top side of member 20. By use of a threaded bolt and nut, arrester clamp 30 is secured to the other section of tab 24 as shown in elevation in FIG. 2. A similar clamp 30 is secured to extension or tab 22 by the same or similar means.

Clamps 30 secure the arresters by use of an encircling collar means disposed around a narrow shank portion provided in the arrester insulating housings near the drop out or ground end of the arrester. The ground leads 25 of all three arresters can be immediately secured to the clamp 30 as best seen in FIGS. 2 and 4. When member 20 is secured to grounded messenger 2, ground leads 25, extending from dropout units 38 and 40, are automatically and efficiently grounded.

Near one end and to one side of mounting member 20 is secured an elongated metal piece 26 designed to support center arrester 36 at a low position below the messenger so that the end of the arrester will extend to the vicinity of bottom phase conductor (FIG. 1) which is located substantially directly below the messenger. As seen from FIG. 2, the end of arrester 36 is substantially beyond those of arresters 32 and 34, obviously necessitated by the triangular configuration of the spacer cable. Extension support piece 26 provides the necessary and proper disposition of center arrester 36 by being fabricated to have a configuration shown in elevation in FIG. 4 and in phantom in FIG. 2. Thus, the messenger end of support piece 26 is slightly bent so as to fit flat against the top surface of elongated messenger mounting member 20. The main portion of piece 26 extends in the direction of bottom phase line 8. The arrester end of support piece 26 is formed at an angle substantially perpendicular to the main portion in order to secure arrester clamp 30 in such a manner that the longitudinal axis of arrester 36 extends in the direction of bottom phase line 8.

For quick and easy connecting of the arresters to the phase conductors (which are usually insulated with a sheath of insulating material), each arrester can be provided with a compression connector 42 having an insulating operating knob means 43. Connector 42 is designed to have a fixed portion attached to the end of the arrester and a removable portion associated with insulating knob means 43. The removable portion is easily separated from the fixed portion leaving a saddle or U-shaped receiving surface available for immediate placement of the phase conductor therein. After the phase conductor is properly placed, the removable portion of connector 42 is reunited with the fixed portion thereof and thereby retains phase conductors 4, 6 and 8 as shown. Electrical connection between the retained phase conductor and the arrester can be made by a metal spike (not shown) disposed within connector 42 and electrically connected to the arrester. The spike punctures the insulating sheath and penetrates into stranded wire power phase conductors when the connector portions are reunited by the lineman. Thus, the lineman need not first skin back or otherwise remove the conductor insulation for the purpose of making the arrester connections.

In FIGS. 3 and 4, dropout unit 38 is shown mounted at a substantially right angle to the longitudinal axis of arrester 36 to insure clearing of both arrester and messenger should the arrester fail and dropout 38 operate. Dropout means 40 are secured in line to arresters 32 and 34, as shown, though the invention is not limited thereto. Dropout means which can be used in the present invention are shown and described in U.S. Patents Nos. 3,153,127 and 3,153,128, issued Oct. 13, 1964, to Osmundsen et al. and Carothers, respectively, and assigned to the present assignee.

As clearly seen in FIGS. 2 through 4, phase conductors 4, 6 and 8 extend through compression connectors 42 forming a part of the lightning arrester structures in a manner that effectively and efficiently maintains spacer cable configuration while simultaneously providing arrester protection with a rugged, low cost, and stable arrester support structure. Well tried standard clamps and hardware can be used thereby assuring reliability in this area as well as use of standard linemen tools. Mounting member 20 and tab extensions 22, 24 and 26 can be inexpensively stamped out of metal sheet material and easily bent to appropriate angles. The structure and assembly herein disclosed is stable in high winds, easy to install and maintains and assures proper grounding of arresters. Further, the all metal bracket structure is removed from the area between the power phase conductors so that excellent air insulation is maintained therebetween. And as noted earlier, only one lineman is needed to mount and connect the applicants' novel arrester assembly, since member 20 can be simply placed across the messenger and turned until the bracket clicks into place.

Although the present invention has been described with a certain degree of particularity, it should be understood that the present disclosure has been made only by way of example and that changes and details of construction may be resorted to without departing from the scope and spirit of the invention. For example, applicants' novel bracket assembly is of such a design that the ground ends of the arresters are above the triangular area of the three-phase conductors. This allows the use of metal clamps 30 on the arresters and avoids the necessity of insulating the ground ends of the arresters. However, should requirements dictate total insulation, non-metallic clamps 30 and tabs 22, 24 and 26 could be used on mounting member 20. In this case, ground leads 25 can be attached directly to metal member 20.

What is claimed is:

1. A lightning arrester bracket and spacer assembly comprising
    an elongated rigid support member,
    a plurality of rigid tab extensions attached to the support member at spaced apart locations along the longitudinal axis of the member,
    said tab extensions extending in a direction substantially perpendicular to the longitudinal axis of the member, and in angular displacement from each other about the longitudinal axis of the support member,
    a plurality of arresters supported by the tab extensions with the longitudinal axes of the arresters disposed in longitudinal displacement along the longitudinal axis of the support member, and in angular displacement about the longitudinal axis of the support member, and
    one end of each of the lightning arresters having means for connecting the arrester to a line conductor.

2. The bracket and assembly of claim 1 in which the arresters are supported in a clamp means attached to each tab extension.

3. The bracket and assembly of claim 1 in which the elongated support member is provided with captive clamp means for securing the support member and bracket to a supporting wire.

4. The bracket and assembly of claim 1 in which the elongated support member has an angular configuration extending the length dimension of the member.

5. A lightning arrester bracket assembly in combination with a spacer cable system having a messenger wire and a plurality of power phase conductors, an elongated, rigid support member mounted on the messenger wire along the length dimension thereof, extension members attached to the mounting member extending substantially in the direction of the phase conductors, respectively, a lightning arrester secured by each of said extension members with the longitudinal axis of each arrester extending generally in a direction substantially perpendicular to its phase conductors and in a position that enables the remote end of each arrester to be adjacent a phase conductor, the arrester having means for connecting the phase conductor to the arrester.

6. The assembly of claim 5 in which the lightning arresters are held in angular displacement from each other by the support and extension members.

7. The assembly of claim 5 in which the rigid support member has an angular shape extending lengthwise thereof.

References Cited

UNITED STATES PATENTS

| | | | |
|---|---|---|---|
| 310,938 | 1/1885 | Gilliland | 174—41 X |
| 2,440,748 | 5/1948 | Johnson | 317—69 X |
| 2,462,247 | 2/1941 | Wright. | |
| 2,798,133 | 7/1957 | Curtis | 200—114 X |
| 3,294,892 | 12/1966 | Curtis | 174—2 |

FOREIGN PATENTS 1,175,318  11/1958  France.

OTHER REFERENCES

Thwaites et al.: "Cluster Arresters Protect Spacer Cable System," Electrical World, vol. 164, No. 15, Oct. 11, 1965, page 28.

LARAMIE E. ASKIN, *Primary Examiner.*